INVENTORS
Rolf Lennart Ignell
Gad Anders Rausing

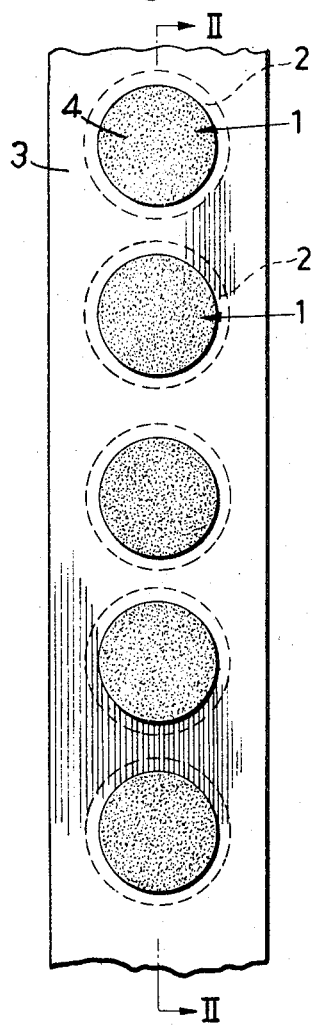
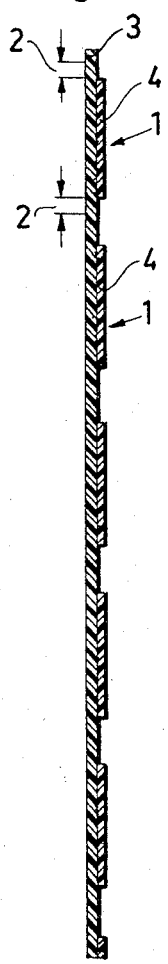
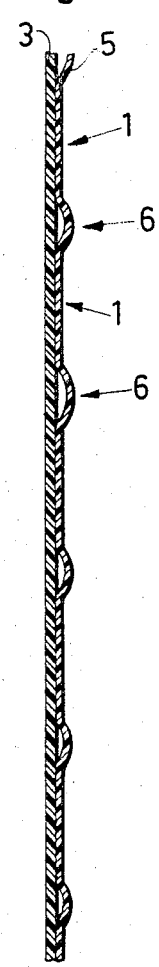
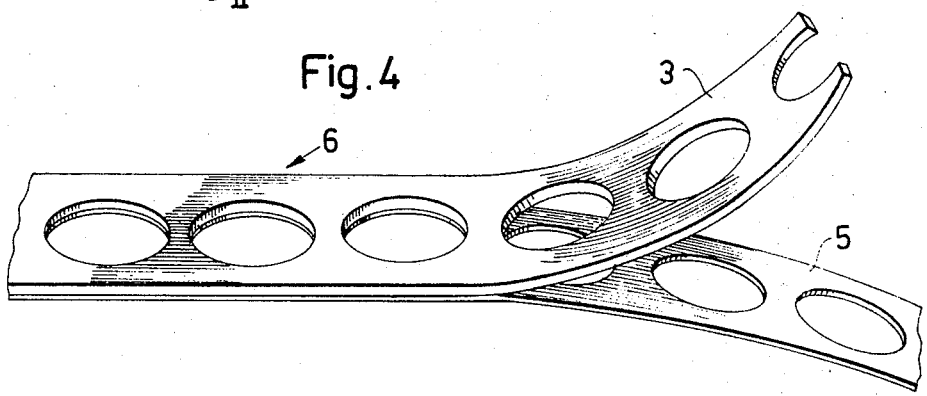

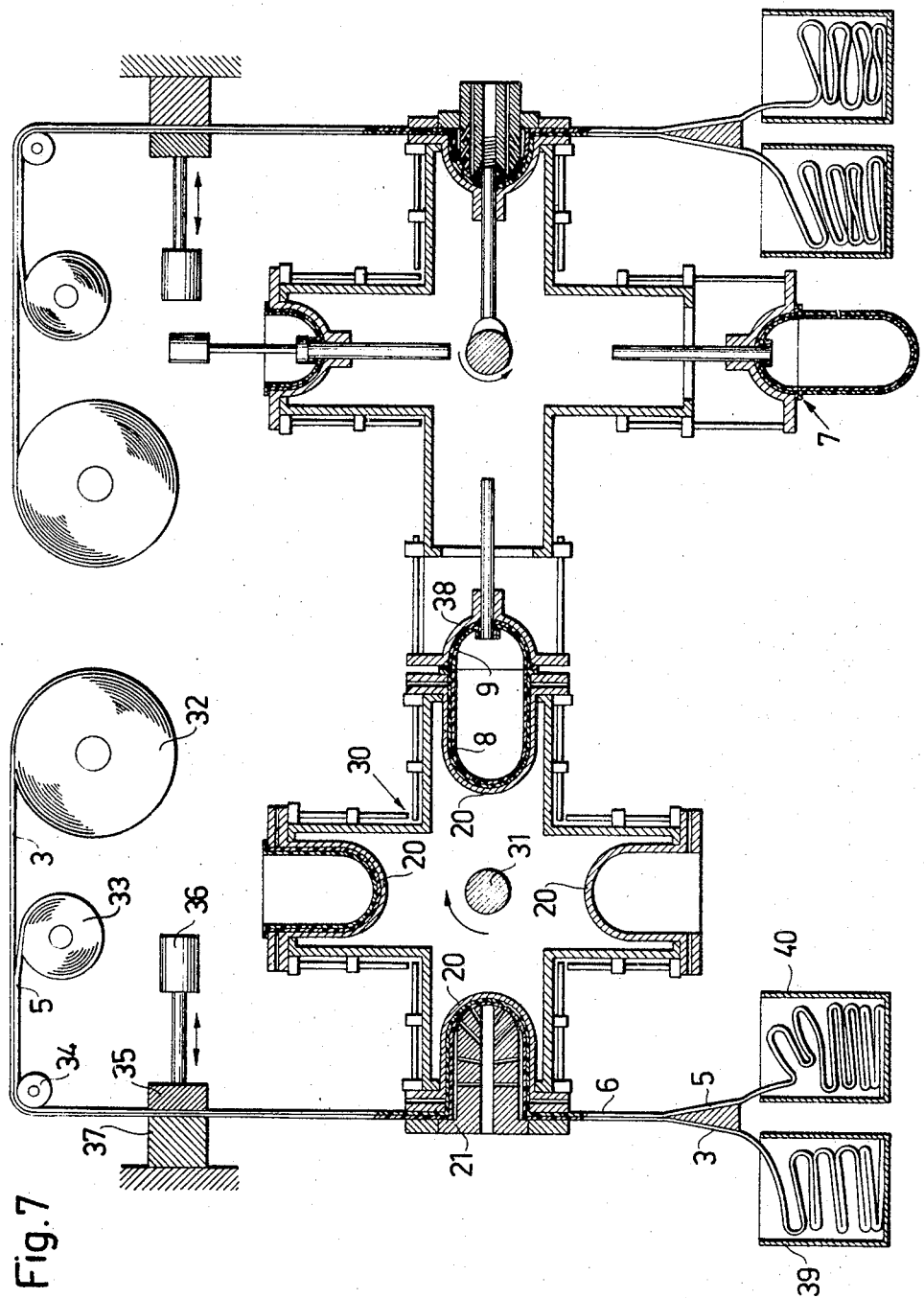

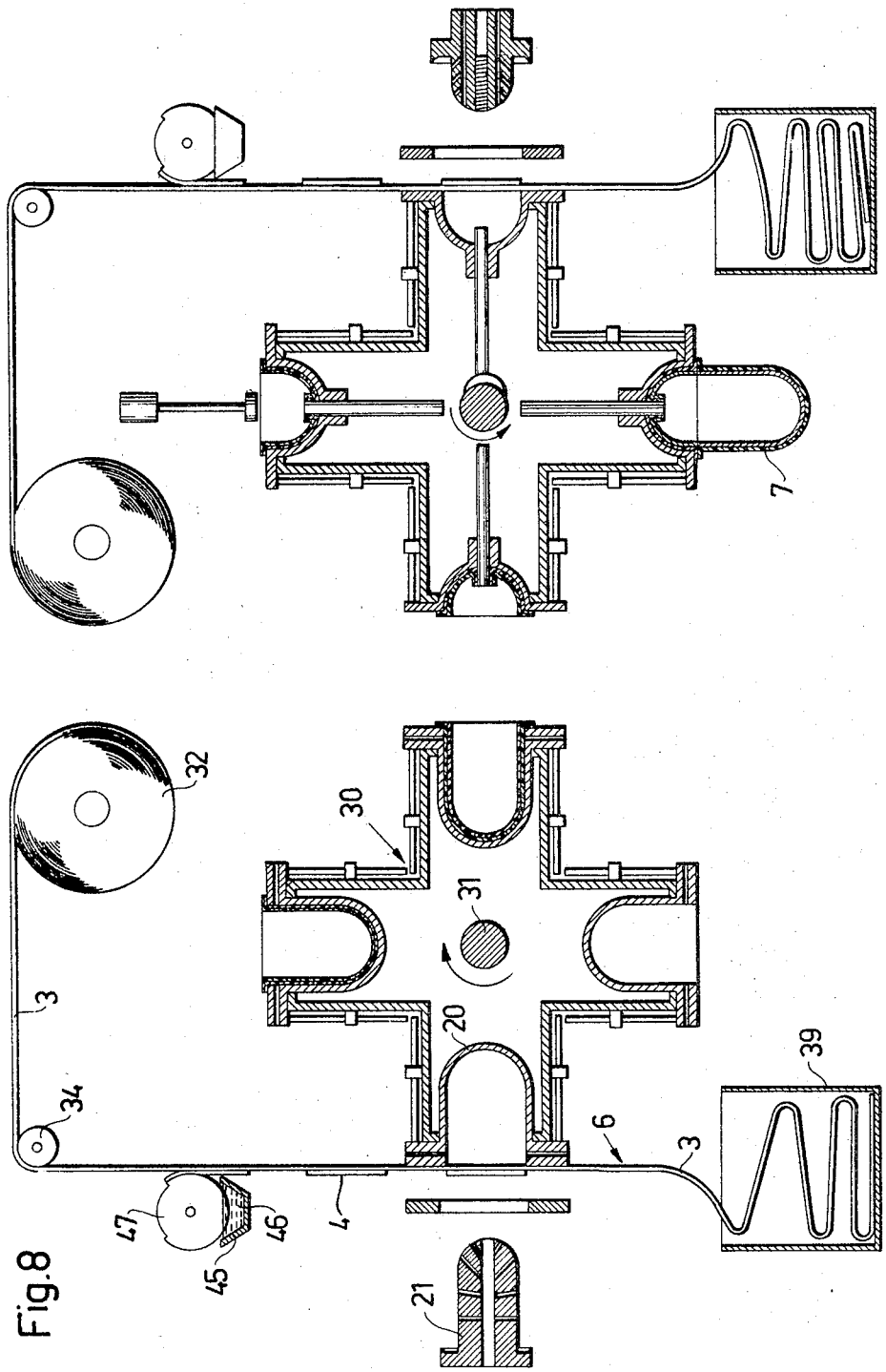

United States Patent Office 3,519,514
Patented July 7, 1970

3,519,514
METHOD IN THE MANUFACTURE OF OBJECTS, PREFERABLY PACKAGES, WITH WALLS HAVING AT LEAST TWO LAYERS OF DIFFERENT THERMOPLASTIC MATERIAL LAMINATED TO ONE ANOTHER
Rolf Lennart Ignell and Gad Anders Rausing, Lund, Sweden, assignors to Sobrefina SA, Fribourg, Switzerland, a Swiss company
Filed Feb. 27, 1967, Ser. No. 618,960
Int. Cl. B32b 31/18
U.S. Cl. 156—267      2 Claims

ABSTRACT OF THE DISCLOSURE

A method of manufacturing packages from at least two laminated layers of different thermoplastic materials. In one embodiment of the method, patches of one of the materials are laminated onto a web of the other material in longitudinal spaced relation along the web, the laminated areas are cut out in succession and formed to establish the wall of the package, and the remaining part of the web is led off to a waste collector. In another embodiment of the invention, the two materials are initially in the form of two webs which are drawn off supply rolls, the two webs are then laminated together over only those longitudinally spaced areas thereof which are to form the walls of each package, the laminated areas are cut out in succession from the webs and formed to establish the wall of the package, and the remaining parts of the two webs are separated and led off to separate waste collectors.

---

This invention relates to a method adapted for use in the manufacture of objects, preferably packages, comprising walls of at least two layers of different thermoplastic materials laminated to one another. In the said method a partial amount of foil- or disc-shaped thermoplastic starting materials is utilized for the manufacture of the said objects, and another partial amount is allowed to leave in the form of unavoidable waste.

In any manufacturing technique of products it is desired to reduce the material amount required for the manufacture of the product and to reduce possible waste. In another method of rendering the product cheaper the unavoidable waste is utilized in an economic way. Since a long time ago, for example, the waste material is used as fuel. In certain production processes of the plastic industry it is also possible to melt the waste and reuse it in the manufacture of the starting materials required for the product in question. This method has proved in many cases the most favourable from an economic point of view. It involves, however, difficulties when the desired product is to be made of a laminate of several types of material. It is, of course, possible to melt the laminated waste for obtaining a mixture, but the subsequent separation of the mixture proves in many cases impossible or to involve substantial difficulties. In cases involving a small percentage of waste, and with minimum low requirements with respect to the purity of the starting material, the waste can be molten and the plastic mixure resuling therefrom be admixed to one of the starting materials. By this admixture, the said starting material gradually will be enriched to a growing degree with the material admixed, up to a certain limit value which in many cases lies on a non-permissible level.

The problem of obtaining a waste which does not consist of a mixture of the two types of material is solved according to the invention in a novel and advantageous way, in that only the portions of one thermoplastic material which are intended to be used in the manufacture of the said product, are laminated with the other thermoplastic material prior to or in connection with the manufacture of the product, the remaining portions of the said first material, however, remaining unlaminated.

Further advantages and characterizing features of the invention will appear from the following description of some preferred embodiments of the invention as well as from a method and an arrangement wherein the invention can be applied.

FIG. 1 is a plan view of one embodiment of the invention wherein, two thermoplastic materials are laminated to one another, one of the materials being a web of indeterminate length and the other being in the form of longitudinally spaced patches of circular or other configuration laminated to the web material.

FIG. 2 is a section on line II–II of FIG. 1,

Figure 5:
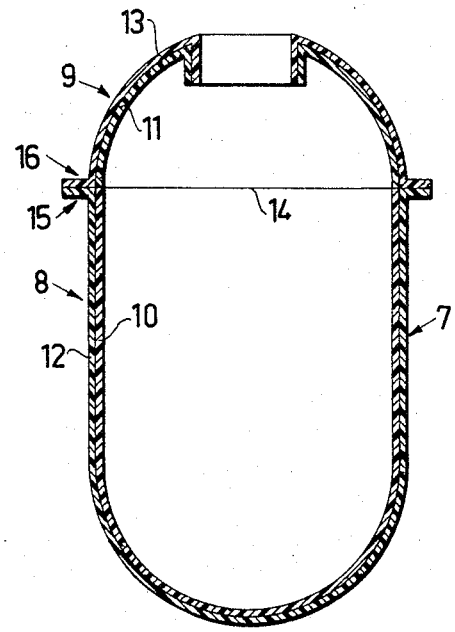
Figure 6:
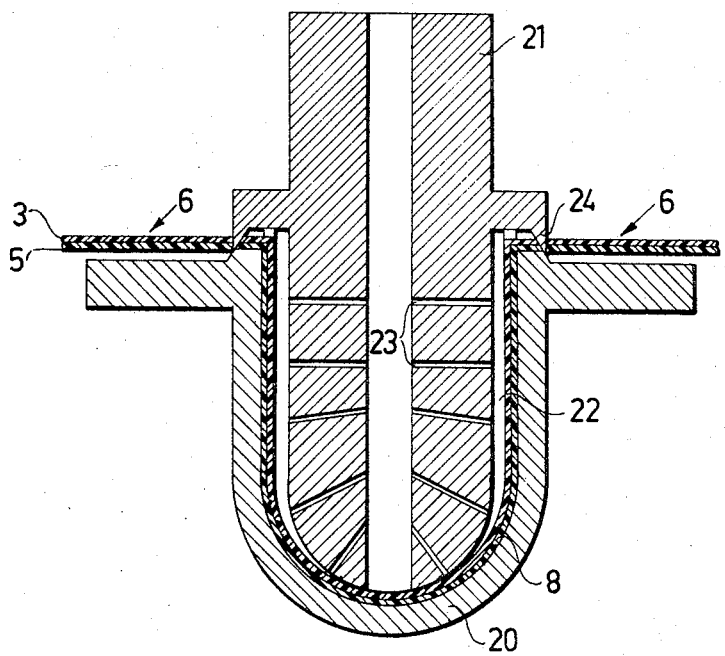

FIG. 3 is a sectional view similar to FIG. 2 but of a different embodiment wherein both of the thermoplastic materials are in the form of webs of indeterminate length, FIG. 4 shows how the waste portions of the two webs of thermoplastic material can be separated, FIG. 5 shows an example of a completed product, in this case a packaging, FIG. 6 shows a tool for the manufacture of the said product, FIG. 7 shows an arrangement in which a laminated web material according to FIG. 3 is formed into packages, and FIG. 8 shows a modified arrangement of FIG. 7 for handling of the material according to FIG. 2.

In the field of plastics, it has been proposed to manufacture beer and aerated water bottles of plastic material. There arose, however, considerable difficulties in realizing these plans. As some of the difficulties can be mentioned for example, that such plastics which in certain respects would be suitable, e.g. rigid, impact resistant polyvinyl chloride which has a high tensile strength and is approved for the storage of foodstuffs, shows unsatisfactory properties in other respects. Polyvinyl chloride, for example, has a certain permeability to gas and, therefore, it is not adapted for the storage of beer and aerated water which have a carbonic acid over-pressure. Moreover, it commands, at least at present, a relatively high price. The said two properties of the polyvinyl chloride mentioned as an example, furthermore, are mutually contradictory, because an attempt of reducing the material costs for bottles of polyvinyl chloride by giving them thinner walls would result in an increase of the carbonic acid passage. For this reason, a laminate of some type had to be used. As one laminate was suggested impact resistant polyvinyl chloride coated with polyvinvylidene chloride, which combination, in addition to satisfying the requirements with respect to mechanical strength, also is impermeable to carbonic acid. A package made of such a laminate, however, has proved to involve considerable costs, although, the material thickness need not be made particularly great. This is due to the fact that the waste cannot be utilized, because it consists of a mixture of two different materials.

According to the invention, therefore, the polyvinyl chloride layer was coated with a layer of polyvinylidene chloride, i.e. the material which usually is sold under the name Saran. The Saran layer is laminated only to the polyvinyl chloride layer in the areas intended to be used for the manufacture of the said bottle. Laminate in this context is to be understood in the broadest meaning of the word and, this also includes materials coated by the utilization of methods which usually are applied in the printing technique.

FIG. 1 shows a laminate consisting of a polyvinyl chloride layer (hereinafter called PVC) in the form of a web 3 of indeterminate length and a Saran layer in the form of longitudinally spaced circular patches 4 laminated to web 3; 1 designates the circular areas within which the two materials are laminated to one another; 2 designates the areas within which the materials are not laminated, but which nevertheless, according to a method shown in the following, can be utliized for the manufacture of the desired gas-tight container. The remaining portions of the material are not intended for use in the manufacture of the package in question, but constitute unavoidable waste.

The material shown in FIG. 2 comprises a base layer of PVC 3 and the patches of Saran 4 laminated thereto within the said areas 1. The Saran layer may be thin in relation to the PVC layer. The material composed according to FIG. 3 is somewhat different as to its nature. The types of material used are still the same, but the Saran does not consist of entirely separated portions corresponidng in size to the areas 1, but rather a web 5 corresponding in width to the PVC web 3. Within the areas 1 the Saran layer 5 is laminated to the PVC layer 3, the remaining parts 6 of the material being unlaminated.

In the manufacture of the package by using the material according to FIG. 2, the portions of both the Saran and the PVC layer corresponding to the areas 1 as well as the portions of the PVC layer corresponding to the areas 2 are used. The remaining material may go off as waste. This waste consists of pure PVC and, thus, can be utilized for the manufacture of new PVC products, for example in the manufacture of new layers 3.

For the material according to FIG. 3 preferably only the portions of the two material layers are used which corespond to the areas 1. The remaining portions 6 are not laminated to each other and, therefore, can be separated, as illustrated in FIG. 4. Hereby is obtained both pure PVC waste which can be re-used in the said manner, and pure Saran.

The package 7 shown in FIG. 5 is made of a material according to FIG. 2 and comprises a lower portion 8 and a top portion 9. The inner surface of the container 7 is entirely coated with Saran, in such a manner, that the Saran layers 10 and 11 respectively of the lower portion and top portion abut at the line 14 along which the two portions 8 and 9 are fixed to each other. 12 and 13 designate an outer layer of PVC, and 15, 16 designate outwardly directed portions of the PVC layers 12 and 13 respectively. The flange-shaped portions 15 and 16 are high-frequency welded to each other and maintain the two portions 8 and 9 connected. The material required for the flanges 15 and 16 is the material which in FIG. 1 is designated by 2. The reason why the Saran layers 10 and 11 was not allowed to be part of the flanges 15 and 16 is, that Saran is less suitable from a sealing point of view.

When the Saran layer is applied on the outer surface of the container, which preferably is intended when the manufacture is based on a material according to to FIG. 3, the Saran very well may be made part of the flanges 15 and 16, because in this case they do not abut to each other. FIG. 6 shows a tool for the manufacture of such a container portion. As in FIG. 3, a PVC layer in web form is designated by 3 and a Saran layer in web form by 5. The material portions located within the moulding tool correspond to the laminated area 1 in FIG. 3, the remaining unlaminated portions being designated by 6 as previously. The moulding tool comprises two parts, viz. one part 20 which is stationary, at least during the moulding process, and a movable part 21. The fixed part 20 has a cavity 22 of the same dimensions as the desired package portion. The movable part 21 is provided with a plurality of air passages 23 through which air is pressed out at the same time as the said part 21 is inserted in the cavity 22, whereby the plasticized plastic material is pressed against the walls of the stationary part 20, which walls define the cavity 22. When the movable part 21 is being inserted to its end position, which is illustrated in FIG. 6, a circular cutting edge 24 mounted on said part penetrates both the PVC and the Saran layers whereby the package parts 8 thus formed are separated from the two partially laminated webs 3 and 5.

The method according to the invention by which the two webs of waste material are obtained in a method for manufacturing PVC containers coated with Saran on their outside, is explained in a greater detail in the following, reference being made to FIG. 7. Herein the methods of manufacturing the lower portion and top portion of a container are substantially analogous. Thus, the method needs to be described only with respect to manufacture of one such portion of the container. The method chosen for detailed description is the method of manufacturing the lower portions.

With reference now to FIG. 7, 30 designates a revolving table with a horizontal shaft 31. The revolving table is provided with four tool parts 20 described in connection with FIG. 6 which tool parts, thus, are rotatable about the shaft 31 to different indexed positions. There is further provided a movable tool part 21 adapted to cooperate in succession with each of the said forming tools 20 in their left-hand position. 32 designates a store roll of PVC foil in one continuous web 3, and 33 is a roll of Saran in the form of a continuous web 5. The two webs are unrolled together and pass over a guide roll 34. The feed of the two webs is intermittent, in such a manner, that at each stop the forming of a container half is effected, in that the movable tool part 21 is inserted in the stationary part 20, at the same time as air presses the plastic material against the walls of the material. At the same time the PVC and Saran foils are laminated to one another within an area 1, see FIG. 3, and at a location along the webs 3, 5 in advance of the station where the tool part 21 is located, by means of a sealing device 35 which is moveable in relation to a plunger 36. 37 is a dolly for the sealing device 35.

In this moment still another operation is carried out, i.e. the welding together of two container parts 8 and 9. The said welding is effected by advancing the tool 38 such, that the flanges 15 and 16, see FIG. 5, strongly are pressed against each other, and high-frequency energy is applied to the said flanges.

When the tools 35, 21 and 38 have returned to their non-operative positions, and a completed container 7 is moved to a collecting basket, the revolving tables are rotated through one quarter of a revolution. At the same time the PVC and Saran materials are advanced a certain distance, so that a laminated area 1 is located directly in front of the tools 20, 21. The waste material 6 is advanced a distance of equal length. Due to the fact, that only the area 1 which is intended for use in the manufacture of the container half was laminated, and that the remaining parts were separated in connection with the forming process by the knife 24, the two materials 3 and 5 can be separated. The PVC waste 3 is directed to a basket 39, and the Saran waste 5 is directed to a basket 40.

The method according to FIG. 8 differs somewhat from the afore-described method. The Saran material 46, in the state of emulsion or solution, is from the beginning in a trough 45 and applied by a roll 47 onto the PVC foil 3. In this case the waste material 6 will consist of pure PVC, because the Saran material is applied only in the areas intended to be used for the goods to be packed.

The coating with Saarn may also be carried out in a separate operation or in connection with the extrusion of the PVC foil. The coating may possibly be made subsequent to or in connection with a heating of the material web by zones.

In the selected embodiments of the invention only such material was shown which consists of two layers laminated to one another. It should, however, be understood that the invention is not restricted to this number of layers, but that it can be applied advanageously also when the laminate contains three or more layers. It may be deemed an advantage, if the completed product, the bottle, has a PVC layer both on its outside and on its inside. This would be an advantage also from a manufacturing point of view, because hereby the risk is eliminated that the Saran sticks to the forming device. For the manufacture of a separable PVC-Saran-PVC material both of the techniques can be utilized, which most clearly is illustrated in FIGS. 2 and 3–4. In the first method the Saran portions 4 will be enclosed between two pieces of PVC material 3. In the latter method, see FIG. 3, the two PVC materials and the intermediate Saran material are fixed together within the areas 1, and the remaining portions remain free.

According to the first method the waste material can be recovered by means of the arrangement and according to the principles previously described with reference to FIG. 8. According to the latter method, wherein three web-shaped materials are laminated within well-defined areas the arrangements and the method according to FIG. 7 can be utilized in an analogous manner. In this case only the separating and collection members need adjustment for being able to recover also the third material.

The invention was described with reference to a special field of application. It is to be understood, however, that the invention is not restricted to the embodiments, materials or methods shown, but that it can be applied advantageously in a great number of fields where different waste materials are to be separated.

We claim:

1. In the method of manufacturing packages having walls composed of at least two laminated layers of polyvinyl chloride and polyvinylidene chloride, the steps which include laminating a web of polyvinyl chloride to a web of polyvinylidene chloride only at longitudinaly spaced successive areas along the webs, each area being coextensive with the area required for a package, successively cutting out at least the laminated area of the two webs, forming packages from the cutouts, separating the unlaminated web materials remaining after removing the cutouts and collecting the separated remaining portions of each web in separate waste receptacles.

2. The method as defined in claim 1 wherein three webs are utilized to establish the laminate, the two outer webs being made of polyvinyl chloride and the inner web therebetween being made of polyvinylidene chloride.

References Cited

UNITED STATES PATENTS

| | | | |
|---|---|---|---|
| 3,396,062 | 8/1968 | White | 156—244 |
| 3,405,020 | 10/1968 | Chavannes | 156—306 |

VERLIN R. PENDEGRASS, Primary Examiner

U.S. Cl. X.R.

156—299; 264—93